(12) United States Patent
Mueller et al.

(10) Patent No.: US 8,971,593 B2
(45) Date of Patent: Mar. 3, 2015

(54) METHODS AND SYSTEMS FOR PERFORMING BIOMETRIC FUNCTIONS

(71) Applicant: Lumidigm, Inc., Albuquerque, NM (US)

(72) Inventors: Horst Arnold Mueller, Rio Rancho, NM (US); Ryan Eric Martin, Tijeras, NM (US); Robert K. Rowe, Corrales, NM (US)

(73) Assignee: Lumidigm, Inc., Albuquerque, NM (US)

( * ) Notice: Subject to any disclaimer, the term of this patent is extended or adjusted under 35 U.S.C. 154(b) by 99 days.

(21) Appl. No.: 13/633,618

(22) Filed: Oct. 2, 2012

(65) Prior Publication Data
US 2013/0272585 A1 Oct. 17, 2013

Related U.S. Application Data

(60) Provisional application No. 61/546,380, filed on Oct. 12, 2011.

(51) Int. Cl.
*G06K 9/00* (2006.01)
(52) U.S. Cl.
CPC .................... *G06K 9/0004* (2013.01)
USPC ............... 382/124; 356/71; 348/77
(58) Field of Classification Search
None
See application file for complete search history.

(56) References Cited

U.S. PATENT DOCUMENTS

| 5,096,290 | A | 3/1992 | Ohta |
| 6,154,285 | A | 11/2000 | Teng et al. |
| 2005/0169506 | A1 | 8/2005 | Fenrich et al. |
| 2005/0249386 | A1 | 11/2005 | Juh |
| 2005/0268962 | A1 | 12/2005 | Gaudiana et al. |
| 2006/0131928 | A1* | 6/2006 | Onizawa et al. ......... 296/146.15 |
| 2008/0277631 | A1* | 11/2008 | Smela et al. ............... 252/520.3 |

FOREIGN PATENT DOCUMENTS

| WO | 96011632 | 4/1996 |
| WO | 03/052675 | 6/2003 |
| WO | 2008111994 | 9/2008 |

OTHER PUBLICATIONS

Dimitris Hristu; Nicola Ferrier; and Roger W. Brockett, "The Performance of a Deformable-membrane Tactile Sensor: Basic Results on Geometrically-defined Tasks", Apr. 2000, Proceedings of the 2000 IEEE International Conference on Robotics & Automation, San Francisco, CA, pp. 508-513.*

* cited by examiner

*Primary Examiner* — Aaron W Carter
*Assistant Examiner* — Siamak Harandi
(74) *Attorney, Agent, or Firm* — Marsh Fischmann & Breyfogle LLP; Kent A. Fischmann

(57) ABSTRACT

Methods and sensors are disclosed for executing a biometric function. Illumination light is generated and directed to a deformable layer when the deformable layer is in a state of deformation resulting from pressure applied to the deformable layer by a skin site. Light scattered from the deformable layer is received. A fingerprint pattern of the skin site is determined from the received light. The biometric function is performed with the determined fingerprint pattern.

35 Claims, 10 Drawing Sheets

METHODS AND SYSTEMS FOR PERFORMING BIOMETRIC FUNCTIONS

CROSS REFERENCE TO RELATED APPLICATION

This application is a nonprovisional of, and claims the benefit of the filing date of, U.S. Prov. Pat. Appl. No. 61/546,380, entitled "METHODS AND SYSTEMS FOR PERFORMING BIOMETRIC FUNCTIONS," filed Oct. 12, 2011 by Horst Arnold Mueller et al., the entire disclosure of which is incorporated herein by reference for all purposes.

BACKGROUND OF THE INVENTION

This application relates generally to biometrics. More specifically, this application relates to performing biometric functions when a layer is in contact with a skin site.

"Biometrics" refers generally to the statistical analysis of characteristics of living bodies. One category of biometrics includes "biometric identification," which commonly operates under one of two modes to provide automatic identification of people or to verify purported identities of people. Biometric sensing technologies measure the physical features or behavioral characteristics of a person and compare those features to similar prerecorded measurements to determine whether there is a match. Physical features that are commonly used for biometric identification include faces, irises, hand geometry, vein structure, and fingerprint patterns, which is the most prevalent of all biometric-identification features. Current methods for analyzing collected fingerprints include optical, capacitive, radio-frequency, thermal, ultrasonic, and several other less-common techniques.

Most of the fingerprint-collection methods rely on measuring characteristics of the skin at or very near the surface of a finger. In particular, optical fingerprint readers typically rely on the presence or absence of a difference in the index of refraction between the sensor platen and the finger placed on it. When the angle of light at an interface is greater than the critical angle and an air-filled valley of the fingerprint is present at a particular location of the platen, total internal reflectance ("TIR") occurs in the platen because of the of the air-platen index difference. Alternatively, if the skin of the proper index of refraction is in optical contact with the platen, the TIR at this location is "frustrated," allowing light to traverse the platen-skin interface. A map of the differences in TIR across the region where the finger is touching the platen forms the basis for a conventional optical fingerprint reading. There are a number of optical arrangements used to detect this variation of the optical interface in both bright-field and dark-field optical arrangements. Commonly, a single quasimonochromatic beam of light is used to perform this TIR-based measurement.

There also exist non-TIR optical fingerprint sensors. Some non-TIR contact sensors rely on some arrangement of quasi-monochromatic light to illuminate the front, sides, or back of a fingertip, causing the light to diffuse through the skin. The fingerprint image is formed because of the differences in light transmission through the finger and across the skin-platen interface for the ridge and valleys. The difference in optical transmission at the interface is due to changes in the Fresnel reflection characteristics that result from the presence or absence of intermediate air gaps in the valleys. Some non-TIR sensors are non-contact sensors, which use polarized light to image the surface features of the finger. In some cases, the imaging system may include a linear polarizer and the illumination light may be polarized in parallel and perpendicular directions to provide two images, which are then combined in some manner to enhance the surface features of the finger.

Although optical fingerprint readers based on TIR phenomena are one of the most commonly deployed types of fingerprint sensors, they are susceptible to image-quality problems due to non-ideal conditions. If the skin is overly dry, the index match with the platen will be compromised, resulting in poor image contrast. Similarly, if the finger is very wet, the valleys may fill with water, causing an optical coupling to occur all across the fingerprint region and greatly reduce image contrast. Similar effects may occur if the pressure of the finger on the platen is too little or too great, the skin or sensor is dirty, the skin as aged and/or worn, or overly fine features are present such as may be the case for certain ethnic groups and in very young children. These effects decrease image quality and thereby decrease the overall performance of the fingerprint sensor. In one recent study, 16% of fingerprint images were found to be of suboptimal image quality as a result of these effects. In some cases, commercial optical fingerprint readers incorporate a thin membrane of soft material such as silicone to help mitigate some of these effects and restore performance. As a soft material, the membrane is subject to damage, wear, and contamination, limiting the use of the sensor before it requires maintenance.

There is accordingly a general need in the art for improved methods and systems for biometric sensing.

SUMMARY

Embodiments of the invention provided methods and sensors for executing a biometric function. Illumination light is generated and directed to an optically distinct portion of a deformable layer while the deformable layer is in a state of deformation resulting from application of pressure to the deformable layer by a skin site. Light scattered from the optically distinct portion of the deformable layer is received and used to generate a displacement map that corresponds to displacements at points of the optically distinct portion of an interface between the deformable layer and the skin site. A fingerprint pattern is determined from the displacement map, and the biometric function is performed with the determined fingerprint pattern.

The fingerprint pattern may be determined by determining a topography of the skin site from the displacement map. The displacement map may be generated by determining positions of the points of the optically distinct portion from the received light to generate a position map, with the displacement map corresponding to a difference between the position map and a reference position map. The reference position map comprises positions of the points of the optically distinct portion when the deformable layer is in a relaxed state.

In some embodiments, the illumination light is generated under a plurality of distinct optical conditions during a single illumination session, such as when the plurality of distinct optical conditions includes a plurality of distinct wavelengths for the illumination light.

The deformable layer may include a plurality of embedded particles. In some such embodiments, the fingerprint pattern is determined by determining the three-dimensional displacements of the embedded particles when the deformable layer is in the state of deformation relative to the positions of the same particles when the deformable layer is in the relaxed state. The topography of the skin site is calculated from the displacements of the embedded particles. The displacement of the interface between the deformable layer and the skin site fingerprint pattern is determined from the displacements of the embedded particles. In one embodiment, the illumination light may be generated at a plurality of illumination angles, enabling the three-dimensional displacement of the embedded particles to be determined by applying a photometric stereo technique. In one embodiment, motion tracking is used to follow each particle as it is displaced between relaxed state and pressure state. In another example, the particles comprise sets of physically distinguishable particles. One way in which the particles may be physically distinguishable includes having a different response to light a particular wavelength. In one embodiment, the particles may be located substantially at the surface of the deformable layer.

The deformable layer may include an optically distinct layer comprised of an image with a plurality of distinct points. The image may be located substantially at the surface of the deformable layer. In such embodiments, the fingerprint pattern is determined by determining the displacements of the distinct points of the image, In some embodiments, the image may comprise a grid. In some such embodiments, the distinct points may comprise the intersections of the grid lines. In other such embodiments the distinct points may comprise the spaces between the lines.

The deformable layer may comprise an elastomeric layer, and may have a Young's modulus less than 100 MPa in some embodiments or less than 20 MPa in other embodiments.

The biometric function may comprise determining an identity of an individual from the fingerprint pattern or may comprise verifying a purported identity of an individual from the fingerprint pattern.

These methods may be embodied in a biometric sensor that comprises an illumination subsystem, a detection subsystem, a deformable platen adapted to receive placement of a skin site, and a computational unit interfaced with the illumination subsystem and with the detection subsystem. The deformable plate comprises a deformable layer that deforms from pressure applied by the skin site. The illumination subsystem comprises an illumination source and illumination-subsystem optics to direct light from the illumination source to the deformable layer. The detection subsystem comprises a camera and detection-subsystem optics to direct light scattered from the deformable layer to the camera. The computational unit comprises instructions to implement the methods as described above.

In another set of embodiments, methods are also provided of executing a biometric function. Illumination light is generated and directed to a skin site, at least a portion of which is covered by a layer substantially conformal with a topography of the skin site. Light scattered from the layer is received so that a fingerprint pattern may be determined and used to perform the biometric function. Similar to the other embodiments described above, the illumination light may be generated under a plurality of distinct optical conditions, including distinct wavelengths for the illumination light, distinct angles for the illumination light, and perhaps also with different polarization conditions. Suitable materials for the layer include makeup, talc, paint, and similar materials.

BRIEF DESCRIPTION OF THE DRAWINGS

A further understanding of the nature and advantages of the present invention may be realized by reference to the remaining portions of the specification and the drawings, wherein like reference labels are used throughout the several drawings to refer to similar components. In some instances, reference labels in include a numerical portion followed by a latin-letter suffix; reference to only the numerical portion of a reference label is intended to refer collectively to all reference labels that have that numerical portion but different latin-letter suffices.

DETAILED DESCRIPTION OF EXEMPLARY EMBODIMENTS

Embodiments of the invention provide methods and systems that may be used to perform biometric functions. Such embodiments may use fingerprint measurements as described herein, with the term "fingerprints" being intended to refer to any topographical skin feature, irrespective of whether it occurs on a finger or on another part of the body. Applications of the invention may find utility not only when applied to topographical features present on the volar surfaces of fingers or hands, but also when applied to other skin locations. Specific examples of skin sites from which "fingerprints" may be extracted thus include all surfaces and all joints of the fingers and thumbs, all surfaces and joints of the toes, the fingernails or toenails and nail beds, the palms, the backs of the hands, the soles of the feet, the wrist and forearms, the face, the ears, areas around the eyes, and all other external surfaces of the body.

Although this disclosure uses the terms "fingerprint," "skin," and the like, the invention may also be applied to other measurement situations in which optical topographic measurements are desired but the native optical properties of the sample make it difficult. For example, some machined barcodes may be too dark to obtain images with certain wavelengths of illumination light and certain exposure values. In other cases, glints or specular reflections may make it difficult to obtain useful images of machined surfaces or other types of markings. Embodiments of the invention allow such topographic information to be generated better than other alternatives.

Figure 1:
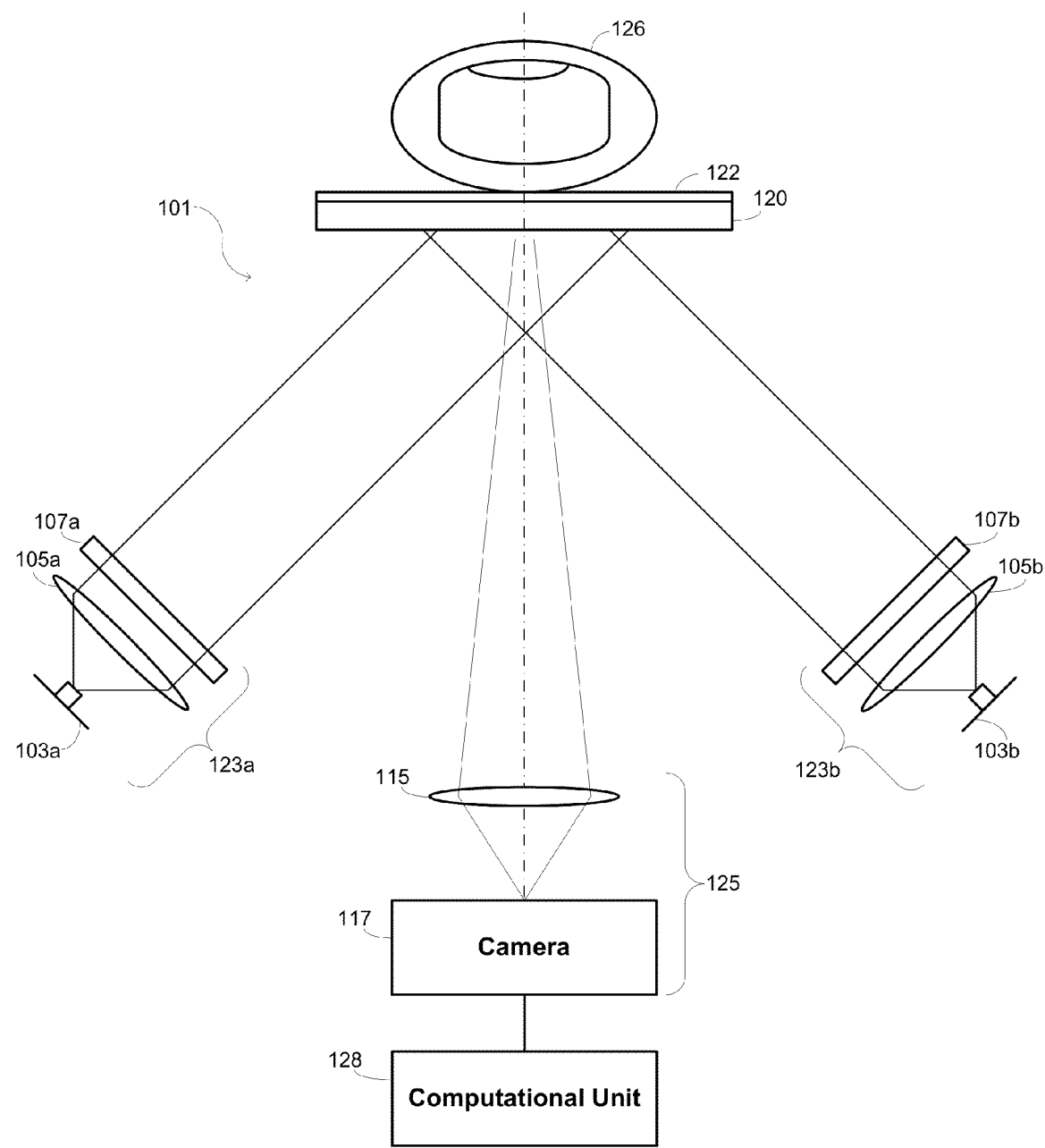
FIG. 1 provides a front view of a biometric sensor used in embodiments of the invention.

A general overview of a structure for a sensor used in performing biometric functions is provided with FIG. 1. The sensor 101 comprises an illumination subsystem 123 having one or more light sources 103 and a detection subsystem 125 with an imager 117. The drawing depicts an embodiment in which the illumination subsystem 123 comprises a plurality of illumination subsystems 123a and 123b, but the invention is not limited by the number of illumination or detection subsystems 123 or 125. For example, the number of illumination subsystems 123 may conveniently be selected to achieve certain levels of illumination, to meet packaging requirements, and to meet other structural constraints of the sensor 101. As another example, there may be multiple detection subsystems 125 arranged in different ways and, in particular, to incorporate different optical effects in one or more of the subsystems.

Illumination light passes from the source 103 through illumination optics 105 that shape the illumination to a desired form, such as in the form of flood light, light lines, light points, and the like. The illumination optics 105 are shown for convenience as consisting of a lens but may more generally include any combination of one or more lenses, one or more mirrors, and/or other optical elements. The illumination optics 105 may also comprise a scanner mechanism (not shown) to scan the illumination light in a specified one-dimensional or two-dimensional pattern. The light source 103 may comprise a point source, a line source, an area source, or may comprise a series of such sources in different embodiments.

In some instances, the light source 103 may comprise one or more quasimonochromatic sources in which the light is provided over a narrow wavelength band. Such quasimonochromatic sources may include such devices as light-emitting diodes, laser diodes, or quantum-dot lasers. Alternatively, the light source 103 may comprise a broadband source such as an incandescent bulb or glow bar. In the case of a broadband source, the illumination light may pass through a bandpass filter 107 to narrow the spectral width of the illumination light. In one embodiment, the bandpass filter 107 comprises one or more discrete optical bandpass filters. In another embodiment, the bandpass filter 107 comprises a continuously variable filter that moves rotationally or linearly (or with a combination of rotational and linear movement) to change the wavelength of illumination light. In still another embodiment, the bandpass filter 107 comprises a tunable filter element such as a liquid-crystal tunable filter, an acousto-optical tunable filter, a tunable Fabry-Perot filter or other filter mechanism known to one knowledgeable in the art.

The detection subsystem 125 may similarly incorporate detection optics 115 that comprise lenses, mirrors, and/or other optical elements that form an image onto the camera 117. The detection optics 115 may also comprise a scanning mechanism (not shown) to relay portions of the collected image onto the camera 117 in sequence. In some cases where the light source 103 is a broadband light source used without a spectral filter 107 in the illumination subsystem 123, a color filter array may be included as part of the detection subsystem 125. Such a color filter array may comprise a microarray of different bandpass filters incorporated directly on the camera 117. A specific common color filter array that is present on many color imaging chips is a Bayer filter, which describes an arrangement of red, green, and blue passband filters, as known to those of skill in the art.

The illumination subsystem 123 and detection subsystem 125 may be configured to operate in a variety of optical regimes and at a variety of wavelengths. One embodiment uses light sources 103 that emit light substantially in the region of 400-1000 nm; in this case, the camera 117 may be based on silicon detector elements or other detector material known to those of skill in the art as sensitive to light at such wavelengths. In other embodiments, the light sources 103 may emit radiation at wavelengths that include the near-infrared regime of 1.0-2.5 µm, in which case the camera 117 may comprise elements made from InGaAs, InSb, PbS, MCT, and other materials known to those of skill in the art as sensitive to light at such wavelengths.

Embodiments of the invention make use of a layer in contact with a skin site, and include embodiments in which the layer is provided as part of the sensor 101, as well as embodiments in which the layer is applied directly to the skin site. In some instances, particularly those in which the layer in provided as part of the sensor, the layer may comprise a deformable layer.

Thus, in embodiments where the layer is included as part of the sensor 101, after the light from the light source 103 passes through the illumination optics 105, and optionally through the optical filter 107, it passes to a platen that includes a rigid support 120 and a deformable layer 122. Light is reflected from the platen to the detection subsystem 125, with information about the topographical structure of a skin site 126 positioned on the platen included in the reflected light as a result of deformation of the deformable layer 122. The rigid support 120 is at least partially transparent to light at the wavelength generated by the light source 103, and may be made of glass or another substantially clear rigid material in various embodiments. In some embodiments, the rigid support 120 may have portions omitted such that the deformable layer 122 is unsupported in those regions.

The present invention includes various embodiments by which the displacements of a plurality of points within or on a deformable membrane are measured. These displacement measurements are then used to calculate the topography of the finger in contact with the deformable membrane. This topographic information is then used to generate a fingerprint image, which may then be stored, transmitted, or used for a biometric function such as identification or verification.

Figure 2A:
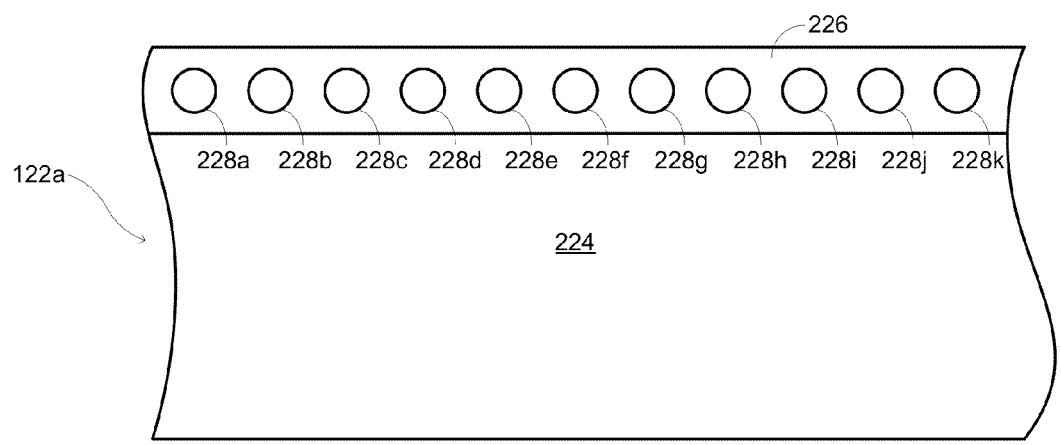
FIGS. 2A-2C provide detailed illustrations of structures of a deformable membrane that may be used in the embodiments of FIG. 1.
Figure 2B:
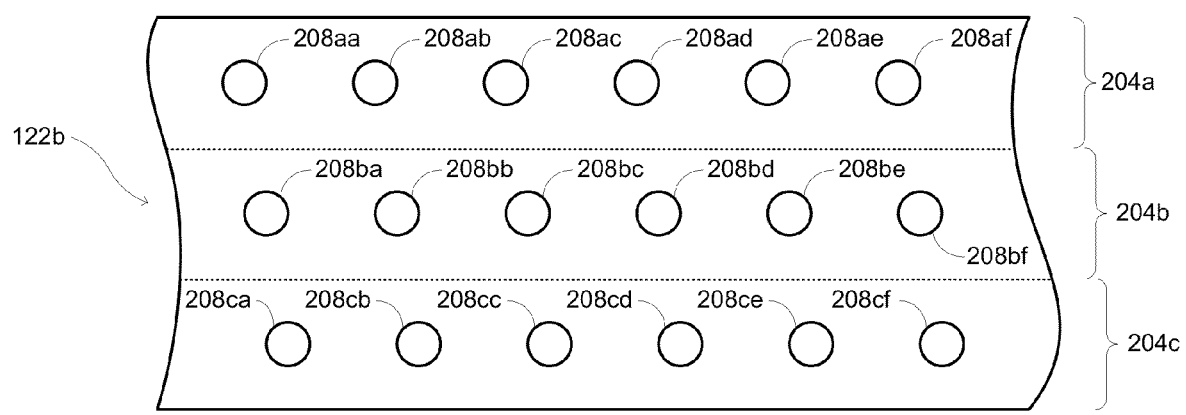
Figure 2C:
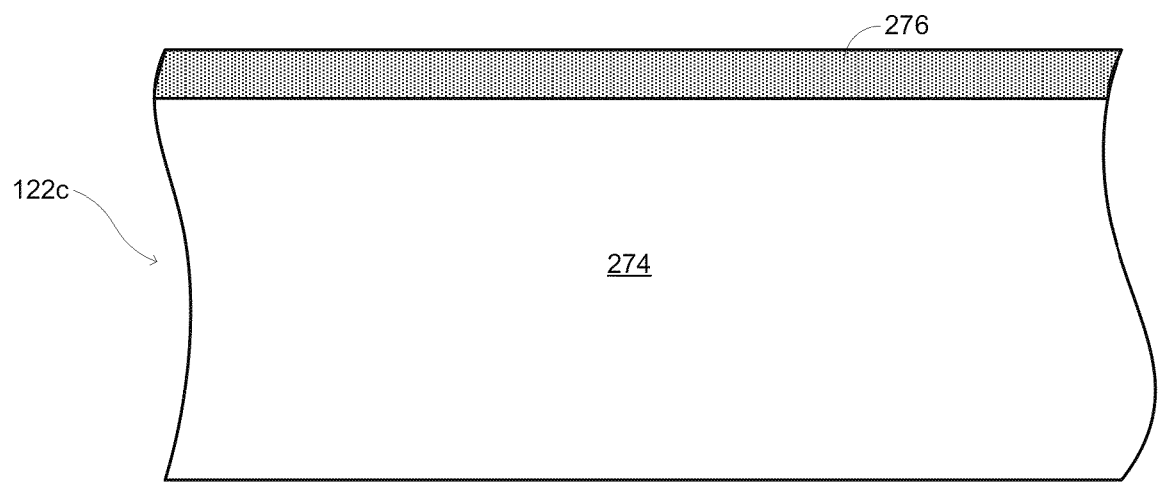

The manner in which information about the topography of the skin site 126 is included in the reflected light varies in different embodiments depending on the specific structure of the deformable layer. Three examples of structures that may be used in different embodiments are shown in FIGS. 2A-C. More generally, the deformable layer comprises one or more elastomeric materials, which generally have a Young's modulus less than 100 MPa and may have a Young's modulus less than 20 MPa. The elastomeric materials may include saturated rubbers, unsaturated rubbers, thermoplastic rubbers, or other types of elastomers. Merely by way of example, some specific elastomeric materials that may be used in embodiments of the invention include natural rubber, silicone rubber, ethylene propylene, fluorosilicone, polyurethane, plastisol, polyisoprene, polyvinyl chloride, and others. Mixtures of elastomeric materials may also be used.

In the embodiment of FIG. 2A, the deformable layer 122a comprises a bulk portion 224 and a surface portion 226, which may be made of the same material as the bulk portion 224 or may be made of a different material. The bulk portion 224 is at least partially transparent at the wavelength of the illumination light so that such light may be reflected from structures 228 embedded within the surface portion. When a skin site 126 is in contact with the deformable platen, the surface portion 126 of the deformable layer 122a is distorted, causing local variations in the shape of the surface portion 226 in accordance with topographical features on the surface of the skin site 126. This shape variation results in movement of the embedded structures 228, which can be detected by the detection subsystem 125.

There are a number of different ways in which the displacement of the embedded structures 228 may be imaged in different embodiments. One particularly useful technique makes use of photometric stereo in an embodiment where the illumination subsystem 123 is configured to provide illumination of the deformable layer 122a from different directions. Changes in intensity of images captured by the detection subsystem 125 depend both on local surface orientation and illumination direction so that surface gradients may be determined and used to calculate the position of each individual embedded structure 228.

The displacement of the embedded particles 228 may be determined by measuring each particle's position using photometric stereo methods while the deformable layer 122a is in the relaxed (untouched) state and again in the deformed state. The measurement of the position of a particle 228a in the relaxed state may be made only once, such as during a factory calibration, and used for each subsequent measurement in the case where the deformable layer 122a and the particles 228 generally return to the same position after deformation. If the layer 122a and the particles 228 are manufactured with sufficient precision, the position of the particles in the relaxed state is known without measurement. Alternatively, the measurement of the position of the particle 288a in the relaxed state may be made periodically on a fixed schedule, such as hourly, daily, or the like. In another alternative, the position of the particle 228a in the relaxed state may be made just prior to or just after the deformable layer 122a is deformed by a finger.

The positions of particles 228 may be measured when the deformable layer 122a is being deformed by a finger. Photometric stereo techniques may be used to estimate each particle's three-dimensional position. The displacement of the particles between the relaxed and deformed states may then be calculated as a simple difference of the three-dimensional positions for each particle, resulting in a three-dimensional displacement vector for each particle. In cases where particles are widely spaced relative to the displacement, the correspondence between the particles in the relaxed and deformed conditions will be unambiguous. However, in the case where particles are closely spaced relative to the displacement, motion tracking during the transition between the relaxed and deformed states may be used. In this case, it is not necessary to illuminate the particles with different light sources, as done using photometric stereo. Instead, one or more of the light sources may be illuminated to provide sufficient light to image the particles and to automatically track the position of each particle in the two-dimensional image in order to establish the necessary correspondence. Alternatively, the particles could have different colors, shapes, or other distinguishing characteristics in order to aid the unambiguous correspondence of particles and their positions in the two states.

Once the three-dimensional displacement vectors are established for each of the particles, the displacement of the interface between the finger and the surface 226 may be estimated. In general, this relationship can be assessed by treating the deformable layer 122 as an elastic body within which the displacements of certain points within the layer are known. Standard modeling methods can be used to determine and solve the displacements of other parts of the layer given the known displacements and the known mechanical properties of the layer. In particular, the displacements of the particles may be interpolated to provide estimates of displacements on a finer grid. In the case of FIG. 2A, where the embedded particles 228 lie very close to the surface 226, the displacements of the particles 228 may be a sufficiently good approximation to the displacement of the surface to be used directly (perhaps with interpolation to a finer grid in some instances).

In contrast to FIG. 2A, the deformable layer 122b in FIG. 2B shows particles that are distributed in some manner within the layer. In such cases, the displacement of some or all of the particles may be determined as described in the case of layer 122a. However, it may be advantageous to estimate the displacement of the surface of layer 122b from the displacements of the particles 208 and the known mechanical properties of the layer.

The embodiment of FIG. 2C has aspects similar to the embodiment of FIG. 2A, in that the deformable layer 122c comprises a bulk portion 274 and a surface portion 276, which may be made of the same material as the bulk portion 274 or may be made of a different material than the bulk portion 274. In this instance, the surface portion 276 contains reflective particles, which may provide different directionality characteristics depending on the structure and orientation of the particles within the elastomeric material. For example, if the particles are flat and mirror-like, high directionality may be achieved when the particles are substantially aligned with each other.

Conversely, the particles may provide a diffuse reflectance such as a Lambertian reflectance in which there is little or no apparent change in reflected brightness when displaced. In cases where the particles are small and closely spaced (perhaps even as a cloud or an undifferentiated reflective surface), features such as lines may be included on the surface in order to isolate and determine distinct points for which displacements may be measured. In one embodiment, the reflective plane may have a grid pattern incorporated on it. The intersections of the grid lines and/or the spaces between the grid lines may be used to determine discrete measurement points.

Once the displacement of the interface between the deformable layer 122 and the finger is determined with sufficient spatial resolution (parallel to the platen surface) and height resolution (perpendicular to the platen surface), a fingerprint image may be generated. In the simplest case, a two-dimensional fingerprint image may be generated by encoding the height of the interface as gray levels. For example, the minimum height displacement may be encoded as an unsigned byte value of 0 while the maximum height displacement may be encoded as an unsigned byte value of 255. Alternatively, the height displacements may be transformed by some nonlinear function before encoding. For example, in order to produce a binary output, one range of z displacements may be assigned a value of 0 and another range may be assigned a value of 1. As a further variant, the nonlinear transform function may be chosen such that the histogram of the output grayscales match a desired grayscale histogram, perhaps corresponding to a different fingerprint modality.

In all of these embodiments, a computational unit 128 is provided in communication with the camera 117 and light sources 103. The computational unit 128 configured to operate the sensor and to analyze collected data in accordance with the particular configuration of the deformable layer 122 and the mode of using information contained in light reflected from the deformable layer 122 to determine the topography of the skin site.

Figure 3:
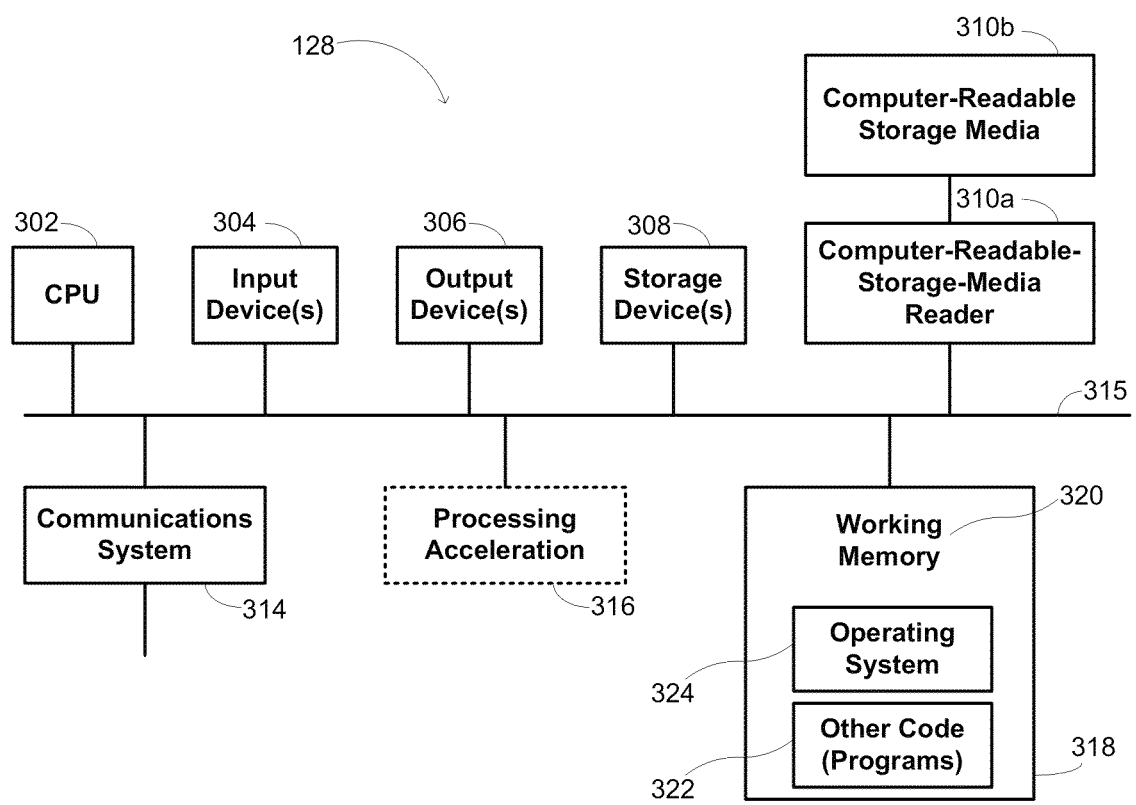
FIG. 3 is a schematic representation of a computational unit that may be used to manage the functionality of the biometric sensor of FIG. 1.

FIG. 3 provides a schematic illustration of the computational unit 128. It may form part of the respective device itself, packaged with the other elements, or may be provided separately. It is shown comprised of hardware elements that are electrically coupled via bus 315. The hardware elements include a processor 302, an input device 304, an output device 306, a storage device 308, a computer-readable storage media reader 310a, a communications system 314, a processing acceleration unit 316 such as a DSP or special-purpose processor, and a memory 318. The computer-readable storage media reader 310a is further connected to a computer-readable storage medium 310b, the combination comprehensively representing remote, local, fixed, and/or removable storage devices plus storage media for temporarily and/or more permanently containing computer-readable information. The communications system 314 may comprise a wired, wireless, modem, and/or other type of interfacing connection and permits data to be exchanged with external devices.

The computational unit 300 also comprises software elements, shown as being currently located within working memory 320, including an operating system 324 and other code 322, such as a program designed to implement methods of the invention. It will be apparent to those skilled in the art that substantial variations may be used in accordance with specific requirements. For example, customized hardware might also be used and/or particular elements might be implemented in hardware, software (including portable software, such as applets), or both. Further, connection to other computing devices such as network input/output devices may be employed.

Figure 4:
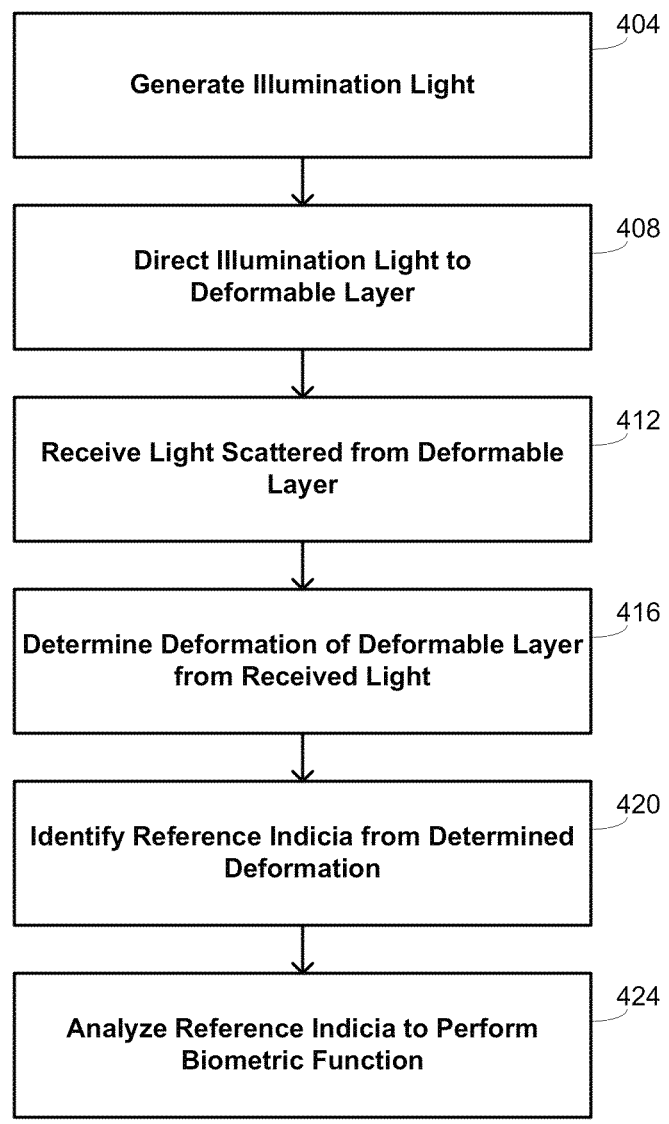
FIG. 4 is a flow diagram summarizing methods of the invention in various embodiments.

Methods of the invention are thus summarized with the flow diagram of FIG. 4. While this diagram sets forth certain steps that may be performed as part of the method, and provides a particular order for the steps, neither of these is intended to be limiting. More generally, additional steps that are not explicitly shown may be performed, certain steps may be omitted, and steps may be performed in an alternative order in different embodiments.

At block 404, illumination light is generated. In some embodiments, the illumination light is generated under multispectral conditions, meaning that light is generated under a plurality of distinct optical conditions during a single illumination session. The different optical conditions may include differences in illumination angle, differences in imaging angle, and differences in illumination wavelength. The light is directed to a deformable layer at block 408. Preferably, the deformable layer comprises an elastomeric layer, and the light may sometimes be directed to the deformable layer through a volume of material that supports the deformable layer. Light scattered from the deformable layer is received at block 412, with the specific characteristics of the scattering being defined by topographical features of a skin site that deforms the deformable layer. The deformation of the layer is accordingly determined at block 416 so that reference indicia of the deformation are determined at block 420. These reference indicia may be analyzed to perform a biometric function, which may include such functions as determining an identity associated with a resultant fingerprint pattern by comparing the fingerprint pattern with a database of fingerprint patterns, or which may include verifying a purported identity of an individual expected to be associated with the fingerprint pattern. Biometric functions may additionally include allowing or denying access to a location or object based on the result of determining or verifying identity, or performing any other type of biometric function based on the resultant fingerprint pattern.

Embodiments in which the layer is applied directly to the skin site may use a version of the sensor described above, but without the deformable layer 122. In these embodiments, a layer is instead applied directly to the skin site as a coating of makeup, talc, paint, or the like that is substantially conformal with the surface topography of the skin site. Such embodiments are particularly well-suited for the imaging of skin sites having relatively poorly defined surface detail because they allow for improved discrimination of detail.

In some embodiments, the coating applied to the skin may act to reduce or substantially eliminate subsurface optical reflections. For example, opaque materials such as certain types of makeup (e.g. foundation), paint, ink, and other types of pigments may serve to block subsurface reflections due to phenomena such as optical absorption, optical scatter, optical interference, and the like. In some embodiments, the coatings may vary spectrally, causing wavelengths of light to be blocked to different degrees by the coating.

In some embodiments, the coating applied to the skin may act to reduce or eliminate spectral variations of the skin. In some embodiments, multiple illumination colors may be used to illuminate the skin, such as the case where red, green, and blue light are used to illuminate the skin simultaneously from multiple angles and a single color image is acquired. In this case, the color image may be separated into the three distinct component images, which may then be analyzed to produce estimated images of the albedo and the topography using photometric stereo methods. In this case, it is preferred that the object (skin) have the same reflectance properties across the multiple illumination wavelengths. This condition is not true for skin, which tends to be more reflective at longer wavelengths and displays different patterns across different wavelengths. In such cases, a spectrally neutral coating such as talcum powder or chalk may be applied to reduce or eliminate such sources of spectral variation.

In some embodiments, the coating may substantially alter the reflectance properties of the skin. For example, in some circumstances, reflected light from skin may contain specular features and/or may otherwise differ from an ideal Lambertian reflector, which some processing algorithms such as photometric stereo may assume. In such cases, a coating such as talcum powder, chalk, makeup foundation, and other such materials with approximately Lambertian reflectance characteristics may be applied.

In some embodiments, a coating may be applied to increase the sensitivity of the surface to changes in illumination angle and/or imaging angle. For example, a metal-flake coating or a coating with optical properties that have significant optical diffraction or optical interference may be applied to the skin. Such particles act to amplify changes in the relative angles of the local skin surface to the illumination and imaging axes, resulting in increased sensitivity of the detected images to small changes in the salient geometric characteristics.

In some embodiments, the skin may not reflect enough light (or too much light) at a particular wavelength. This may be due to the natural reflectance properties of the skin or some type of pigment, ink, or other topical contaminant. Such effects may be adjusted by applying a coating material to the skin with desired reflectance characteristics.

Figure 5:
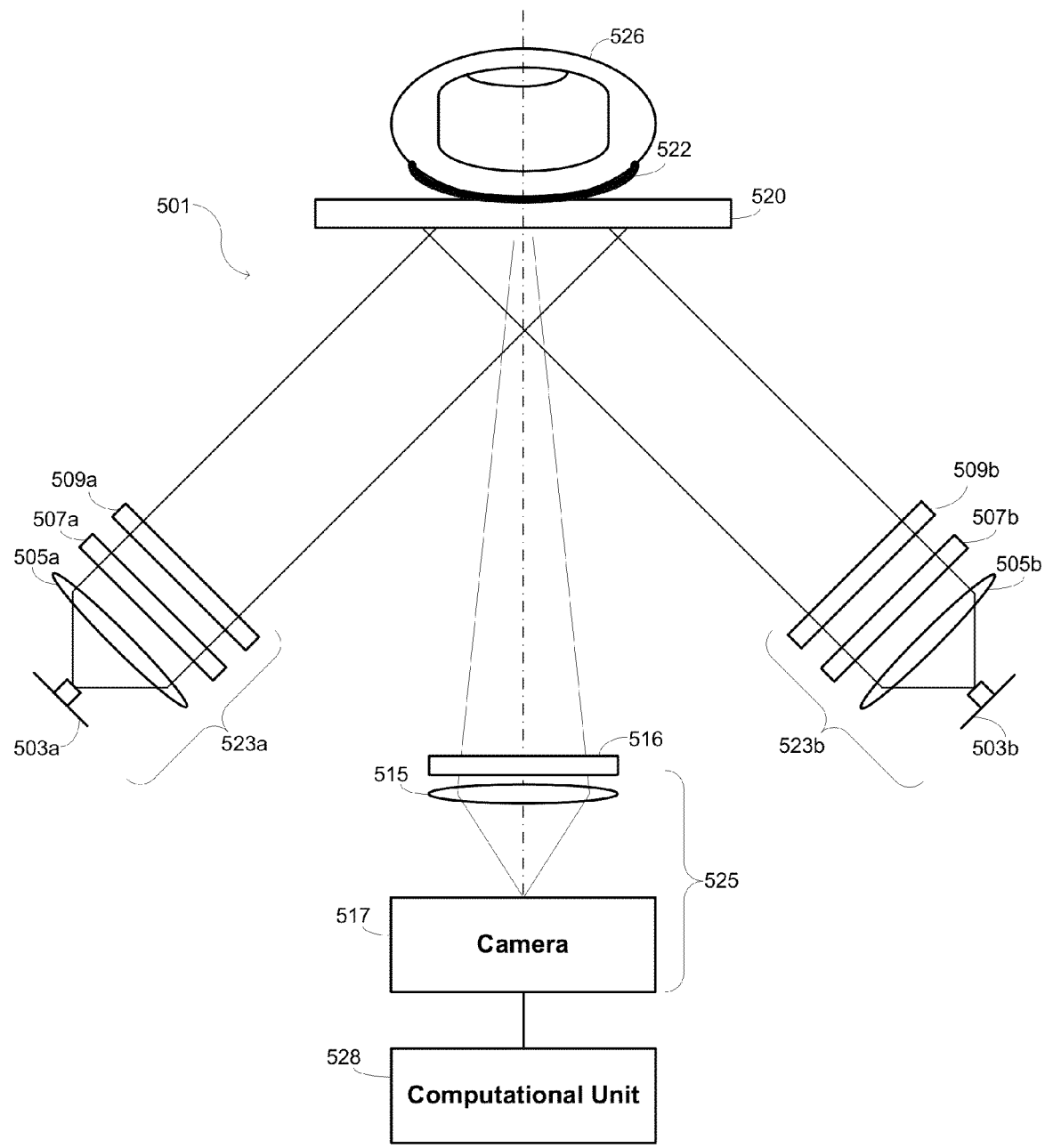
FIG. 5 provides a front view of a biometric sensor used in other embodiments of the invention.

An example of the benefit of the invention is illustrated in FIG. 5, which provides a front view of a biometric sensor 501 similar to the biometric sensor of FIG. 1. In particular, the biometric sensor 501 includes a platen 520; an illumination system 523 with light sources 503, illumination optics 505, and potentially a filter 507; a detection subsystem 525 with detection optics 515 and a camera 517; and a computational unit 528. In this example, the illumination and detection optics may additionally include polarizers 509 and 516, which may be circular polarizers, linear polarizers, or a combination. The polarizers may be provided in a crossed configuration relative to each other to enable optical measurements to be made in such a way that surface reflections are minimized and/or other polarization characteristics of the coating are emphasized.

In some embodiments, the platen may be eliminated such that the measurements are made with little or no contact between the coating 522 and the rest of the sensor 501.

Figure 6:
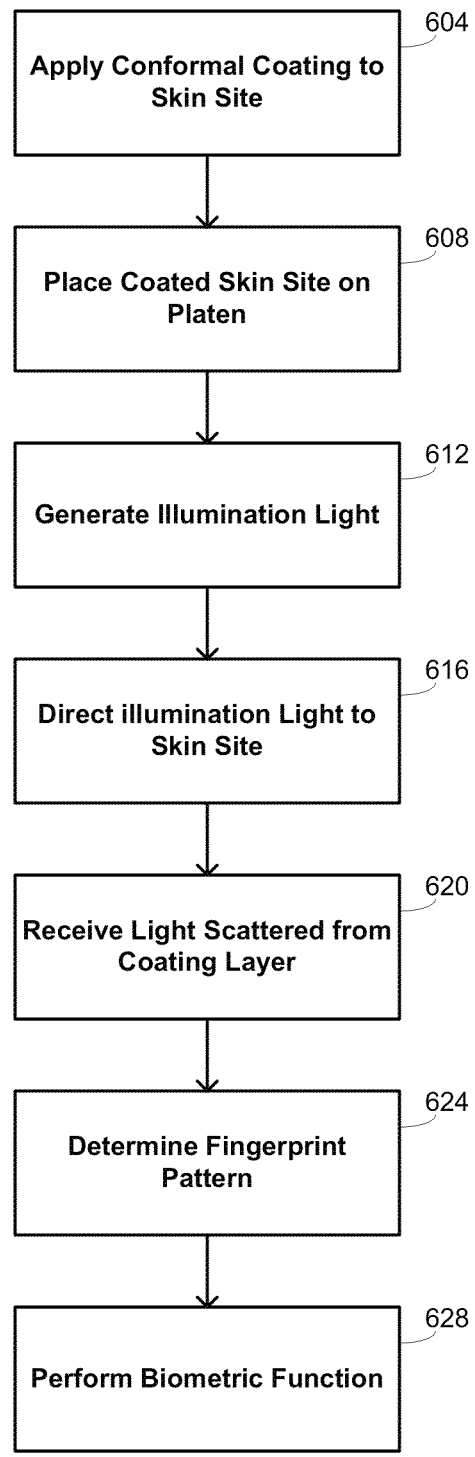
FIG. 6 is a flow diagram summarizing methods of the invention that may use the biometric sensor of FIG. 5.

Methods of the invention that use the biometric sensor of FIG. 5 are illustrated with the flow diagram of FIG. 6. At block 604, the conformal coating is applied to the skin site.

Generally, the coating is sufficiently thin that topographical features of the skin site are manifested by the shape of the coating over the skin site. While the inventors have found that makeup, talc, and paint provide suitable coating materials, other similarly thin coatings are expected to provide equally reliable results. At block 608, the coated skin site is placed on the platen of the sensor so that images may be collected. Illumination light is generated at block 612 and directed to the coated skin site at block 616. Light scattered from the coating layer is received at block 620; in embodiments where subsurface characteristics are also to be used, the light collected at block 620 may include light scattered from beneath a surface of the skin site. At block 624, a fingerprint pattern is determined from the portion of the light corresponding to reflection from the coating so that the biometric function may be performed at block 628 with the determined fingerprint pattern.

Figure 7B:
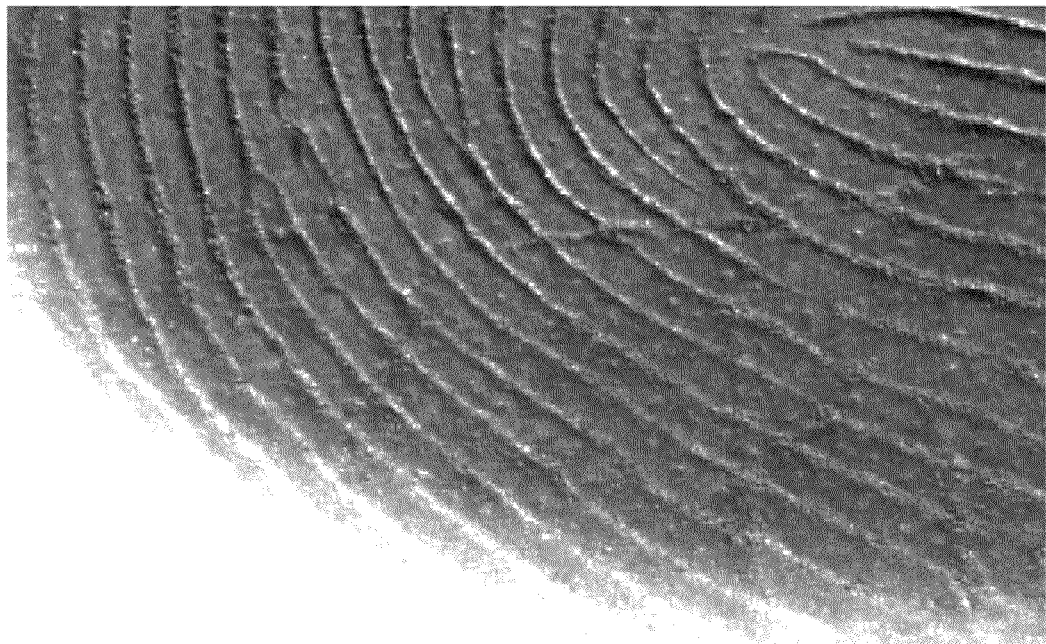
FIGS. 7A and 7B provide a comparison of images of a skin site respectively collected without and with a conformal layer on the skin site.
Figure 7A:
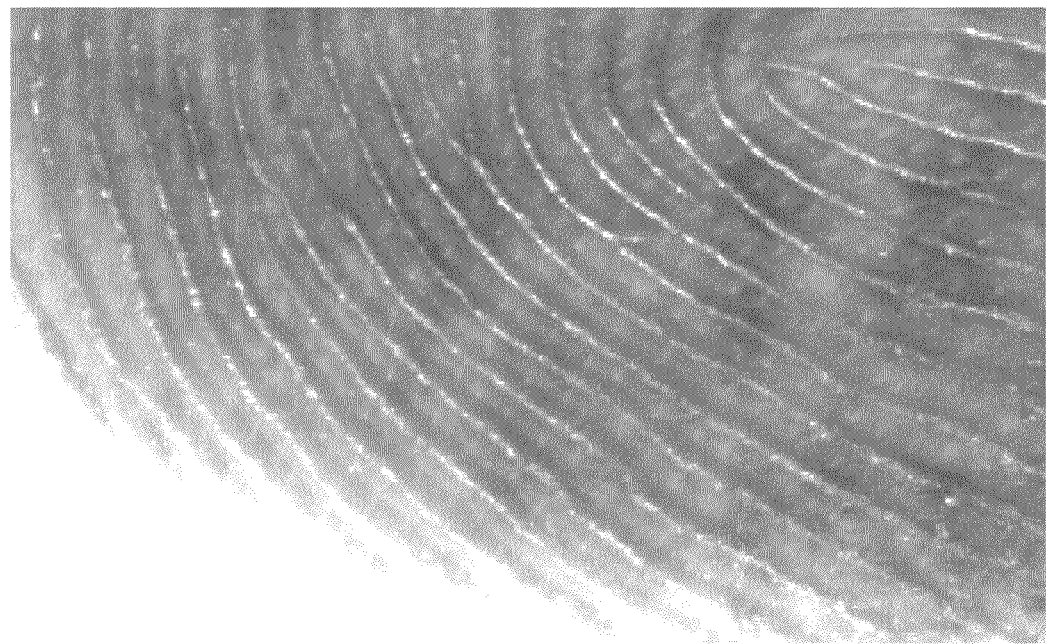
Figure 8B:
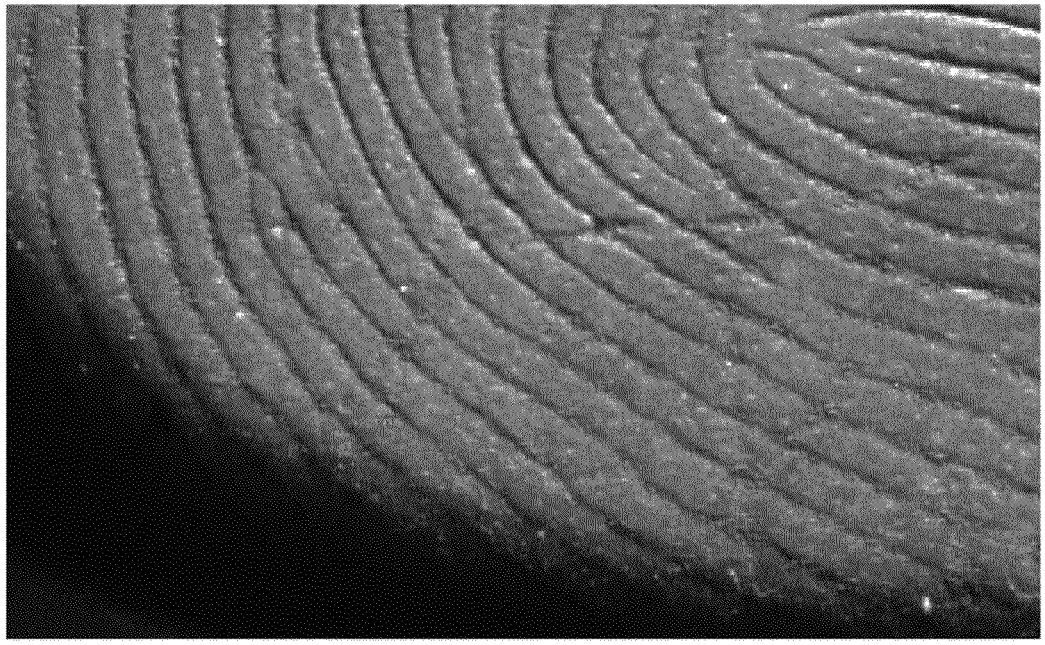
FIGS. 8A and 8B provide a comparison of images of a skin site respectively collected without and with a conformal layer on the skin site.
Figure 8A:
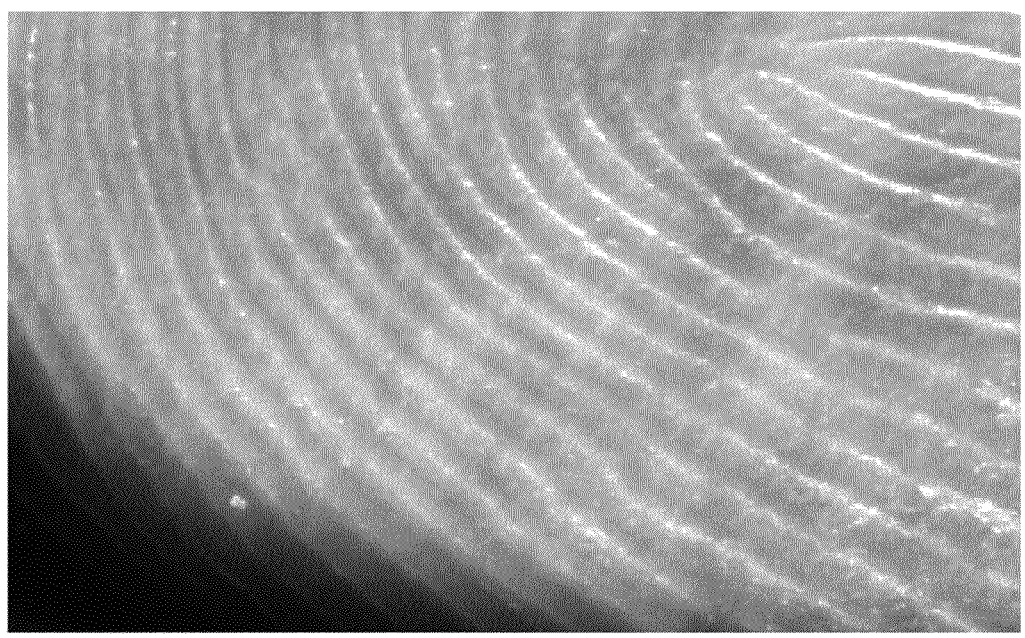

Images collected in this way are shown in FIGS. 7A-9C to provide a comparison of image quality resulting from the use of the layer on the skin site. For example, effectiveness was tested by imaging a skin site without the application of a conformal layer and by imaging the same skin site after application of a substantially conformal layer in the form of makeup. FIGS. 7A and 8A respectively show different image frames without the presence of a conformal layer, while FIGS. 7B and 8B respectively show the same frames with makeup applied to the skin site. It is evident even from a visual inspection of the images that the presence of makeup as shown in FIGS. 7B and 8B allows for the discrimination and identification of detail that is obscured in corresponding images shown in FIGS. 7A and 8A without makeup. Such detail is sufficient to improve reliability in performing biometric functions with the images.

Figure 9C:
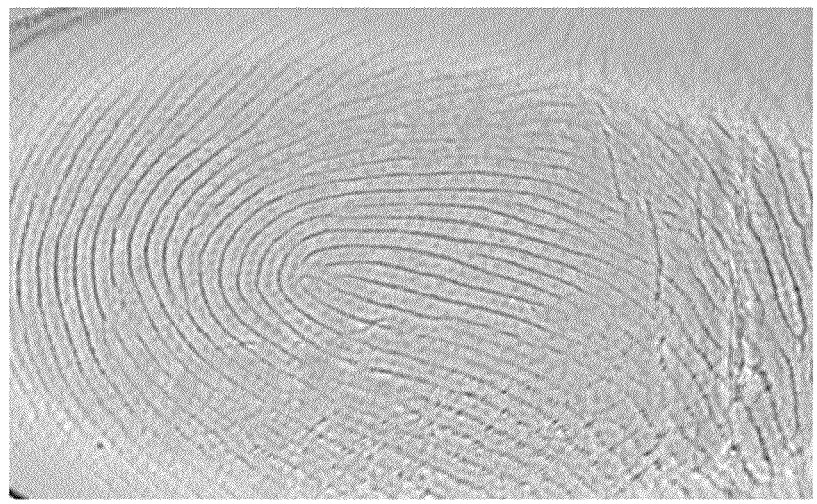
FIGS. 9A, 9B provide a comparison of images of a skin site respectively collected without and with a conformal layer on the skin site, and FIG. 9C provides a comparison image of a skin site collected without a conformal layer on the skin site after scatter correction.
Figure 9B:
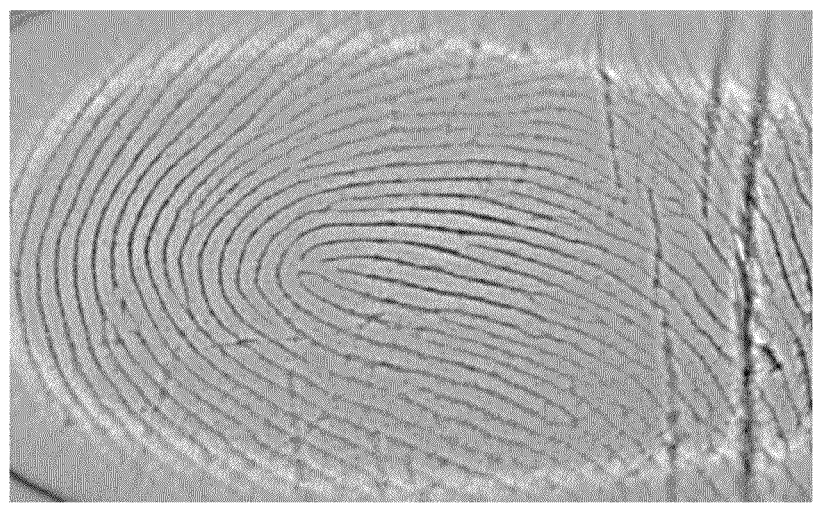
Figure 9A:
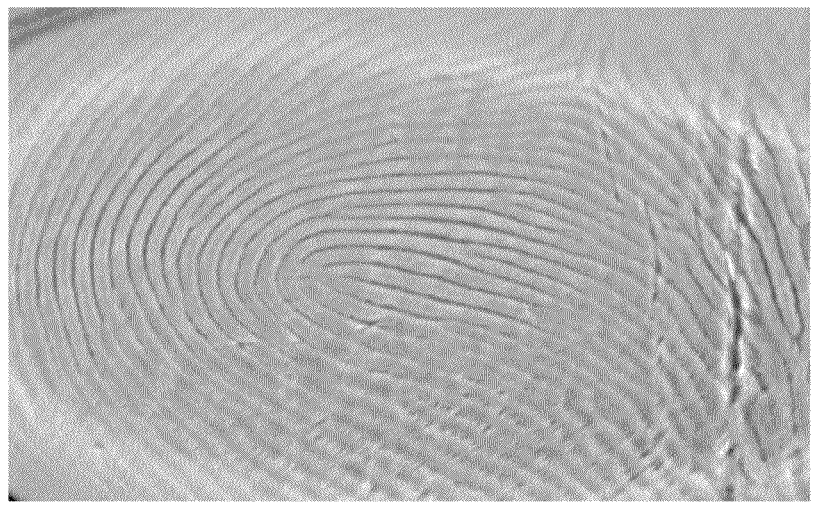

The inventors have also found that the inclusion of a substantially conformal layer may improve the discrimination of detail in a manner superior to the application of at least some image-processing techniques. This is illustrated, for instance, with FIGS. 9A-9C. FIG. 9A is a topographic image of a skin site collected without the presence of a deformable layer 122 in the sensor and without the presence of a conformal layer on the skin site. FIG. 9B is a topographic image of the same skin site collected with the presence of makeup as a substantially conformal layer applied to the skin site. FIG. 9C is a topographic image derived from FIG. 9A after application of scatter correction. Even a visual comparison of the images demonstrates that while the scatter-corrected image of FIG. 9C allows discernment of more detail than the uncorrected image of FIG. 9A, it still provides less detail than the image collected with the presence of a conformal layer as shown in FIG. 9B.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method of executing a biometric function, the method comprising:
   generating illumination light;
   directing the illumination light to an optically distinct portion of a deformable layer while the deformable layer is in a state of deformation resulting from application of pressure to the deformable layer by a skin site;
   receiving light scattered from the optically distinct portion of the deformable layer;
   generating a displacement map from the received light, the displacement map corresponding to displacements at points of the optically distinct portion of an interface between the deformable layer and the skin site;
   determining a fingerprint pattern of the skin site from the displacement map; and
   performing the biometric function with the determined fingerprint pattern.

2. The method recited in claim 1 wherein determining the fingerprint pattern comprises:
   determining a topography of the skin site from the displacement map; and
   determining the fingerprint pattern from the determined topography of the skin site.

3. The method recited in claim 1 wherein generating the displacement map comprises:
   determining positions of the points of the optically distinct portion from the received light to generate a position map; and
   generating the displacement map as a difference between the position map and a reference position map, the reference position map comprising positions of the points of the optically distinct portion when the deformable layer is in a relaxed state.

4. The method recited in claim 1 wherein generating the illumination light comprises generating the illumination light under a plurality of distinct optical conditions.

5. The method recited in claim 4 wherein the plurality of distinct optical conditions includes a plurality of distinct wavelengths for the illumination light.

6. The method recited in claim 1 wherein the deformable layer comprises a plurality of particles embedded within the deformable layer.

7. The method recited in claim 6 wherein determining the fingerprint pattern of the skin site comprises determining three-dimensional displacements of the particles when the deformable layer is in the state of deformation relative to positions of the particles when the deformable layer is in a relaxed state.

8. The method recited in claim 7 wherein determining the fingerprint pattern of the skin site further comprises determining a displacement of the interface from the three-dimensional displacements of the particles.

9. The method recited in claim 8 wherein determining the fingerprint pattern further comprises determining a topography of the skin site from the displacement of the interface.

10. The method recited in claim 7 wherein:
    generating the illumination light comprises generating the illumination light at a plurality of illumination angles; and
    determining the three-dimensional displacements of the particles comprises applying a photometric stereo technique.

11. The method recited in claim 7 wherein determining three-dimensional displacements of the particles comprises tracking motion of each of the particles as the deformable layer is displaced between the relaxed state and the state of deformation.

12. The method recited in claim 7 wherein the particles comprise a plurality of sets of physically distinguishable particles.

13. The method recited in claim 12 wherein each of the sets of physically distinguishable particles consists of particles having a different response to light of a particular wavelength.

14. The method recited in claim 6 wherein the particles are located substantially at a surface of the deformable layer.

15. The method recited in claim 1 wherein the optically distinct layer comprises an image having a plurality of distinct points.

16. The method recited in claim 15 wherein the image is located substantially at a surface of the deformable layer.

17. The method recited in claim 15 wherein determining the fingerprint pattern comprises determining displacements of the distinct points when the deformable layer is in the state of deformation relative to positions of the distinct points when the deformable layer is in a relaxed state.

18. The method recited in claim 15 wherein the image comprises a grid.

19. The method recited in claim 18 wherein the distinct points comprise intersections of lines defining the grid.

20. The method recited in claim 18 wherein the distinct points comprise spaces between lines defining the grid.

21. The method recited in claim 1 wherein the deformable layer comprises an elastomeric layer.

22. The method recited in claim 1 wherein the deformable layer has a Young's modulus less than 100 MPa.

23. The method recited in claim 1 wherein the deformable layer has a Young's modulus less than 20 MPa.

24. The method recited in claim 1 wherein the biometric function comprises determining an identity of an individual from the determined fingerprint pattern.

25. The method recited in claim 1 wherein the biometric function comprises verifying a purported identity of an individual from the determined fingerprint pattern.

26. A biometric sensor for executing a biometric function, the biometric sensor comprising:
  an illumination subsystem;
  a detection subsystem;
  a deformable platen adapted to receive placement of a skin site; and
  a computational unit interfaced with the illumination subsystem and with the detection subsystem, wherein:
    the deformable platen comprises a deformable layer;
    the illumination subsystem comprises:
      an illumination source; and
      illumination-subsystem optics to direct light from the illumination source to the deformable layer;
    the detection subsystem comprises:
      a camera; and
      detection-subsystem optics to direct light scattered from the deformable layer to the camera; and
    the computational unit having computer-readable storage including the following instructions and a processor to perform the following:
      instructions to operate the illumination subsystem to direct light from the illumination source to an optically distinct portion of the deformable layer while the deformable layer is in a state of deformation resulting from application of pressure to the deformable layer by the skin site;
      instructions to operate the detection subsystem to receive light scattered from the optically distinct portion of the deformable layer with the camera;
      instructions to generate a displacement map from the received light, the displacement map corresponding to displacements at points of the optically distinct portion of an interface between the deformable layer and the skin site;
      instructions to determine a fingerprint pattern of the skin site from the displacement map; and
      instructions to perform the biometric function with the determined fingerprint pattern.

27. A method of executing a biometric function, the method comprising:
  generating illumination light;
  directing the illumination light to a skin site, a least a portion of the skin site being covered by layer substantially conformal with a topography of the skin site;
  receiving light scattered from the layer;
  determining a fingerprint pattern from spatial analysis of the layer based on the received light; and
  performing the biometric function with the determined fingerprint pattern.

28. The method recited in claim 27 wherein generating the illumination light comprises generating the illumination light under a plurality of distinct optical conditions.

29. The method recited in claim 28 wherein the plurality of distinct optical conditions comprises a plurality of distinct wavelengths for the illumination light.

30. The method recited in claim 29 wherein directing the illumination light to the skin site comprises sequentially directing the distinct wavelengths to the skin site.

31. The method recited in claim 29 wherein directing the illumination light to the skin site comprises simultaneously directing the distinct wavelengths to the skin site.

32. The method recited in claim 28 wherein the plurality of distinct optical conditions comprises a plurality of distinct illumination angles for the illumination light.

33. The method recited in claim 27 wherein:
  directing the illumination light to the skin site comprises polarizing the illumination light with a first illumination; and
  receiving light scattered from the layer comprises polarizing the scattered light with a second polarization.

34. The method recited in claim 33 wherein the first and second polarizations are substantially crossed relative to each other.

35. The method recited in claim 27 wherein the layer comprises makeup, talc, paint, or a similar material.

* * * * *